United States Patent [19]

Bridges

[11] Patent Number: 4,570,567
[45] Date of Patent: Feb. 18, 1986

[54] AIR CLASSIFICATION IN A SPRAY GRAINER

[75] Inventor: William G. Bridges, Athens, Tenn.

[73] Assignee: Olin Corporation, Cheshire, Conn.

[21] Appl. No.: 538,024

[22] Filed: Sep. 30, 1983

[51] Int. Cl.[4] .................................. B05B 15/00
[52] U.S. Cl. .................................. 118/64; 118/303; 366/135; 366/137
[58] Field of Search ............ 118/19, 20, 303, 64; 425/222; 366/135, 137

[56] References Cited

U.S. PATENT DOCUMENTS

| | | | |
|---|---|---|---|
| T980,005 | 3/1979 | Shirley, Jr. | 264/7 |
| 2,112,848 | 4/1938 | Jackson | 366/135 |
| 3,101,040 | 8/1963 | Lanz | 99/335 |
| 3,333,297 | 8/1967 | Tytus et al. | 18/1 |
| 3,544,267 | 12/1970 | Dychdala | 23/86 |
| 3,580,545 | 5/1971 | O'Brien | 259/3 |
| 3,645,005 | 2/1972 | Dychdala et al. | 34/22 |
| 3,793,216 | 2/1974 | Dychdala et al. | 252/187 |
| 3,877,415 | 4/1975 | Blouin | 118/303 |
| 3,894,882 | 7/1975 | Takewell et al. | 186/288 |
| 3,991,225 | 11/1976 | Blouin | 427/3 |
| 4,127,388 | 11/1978 | Maczko et al. | 422/258 |
| 4,258,024 | 3/1981 | Hoffer et al. | 423/474 |
| 4,272,234 | 6/1981 | Tse | 425/222 |
| 4,328,200 | 5/1982 | Welch et al. | 423/474 |
| 4,353,852 | 10/1982 | Tse | 264/37 |
| 4,355,014 | 10/1982 | Murakami et al. | 423/265 |
| 4,478,170 | 10/1984 | Bridges et al. | 118/64 |
| 4,478,171 | 10/1984 | Bridges et al. | 118/64 |

*Primary Examiner*—John P. McIntosh
*Attorney, Agent, or Firm*—Ralph D'Alessandro; Donald F. Clements; Thomas P. O'Day

[57] ABSTRACT

In a rotary drum spray grainer there is provided a solid product material exit at the same end as the inlet hot air so that air classification of the solid product material according to size is achieved while the solid product material passes counter-current to the inlet hot air as the solid product material exits the drum.

11 Claims, 4 Drawing Figures

AIR CLASSIFICATION IN A SPRAY GRAINER

BACKGROUND OF THE INVENTION

This invention relates generally to rotary drum spray grainers and more particularly to the use of the air flow in a rotary drum spray grainer to obtain air classification of the spray grained calcium hypochlorite product particles as the particles exit the rotary drum spray grainer passing counter-current to the inlet hot air flow.

The use of a rotary drum apparatus to apply coatings or encapsulations to particulate substrates by the spraying of slurries, melts, or solutions and suspensions onto moving beds of particles that fall in cascades within the apparatus is well known. The application of distinct and separate coatings to a particulate substrate is known as granulation and is widely used in the fertilizer industry, for example in the production of ammonium nitrate. The application of coatings or encapsulations on a particulate substrate can also be employed in the making of confections, such as sugars, or, as in the case of the instant invention, in the manufacture of calcium hypochlorite for use as a commercial bleaching and sanitizing agent, particularly in the disinfection of swimming pool waters.

Previous attempts to employ a rotary drum spray grainer in the process of manufacturing spray grained particles employ either a deflector means that runs the entire length of the rotary drum and which overlies the spraying means or nozzles or, in the alternative, utilize no deflector means in the rotary drum. Both of these approaches utilize spray grainer particle flow that is in the same direction as or co-current to the direction of inlet air flow into the drum. In other words, inlet air is brought in a first end of the drum and the spray grained product particles exit the opposing second end of the drum. Seed particles are also normally introduced at or near the first end of the drum.

Rotary drum spray grainers which use this co-current product particle flow in the same direction as the air flow through the drum require some type of an external sorting and recycle of the undersized product particles by a screw type of conveyor back into the spray grainer. This movement of the product particles outside of the spray grainer frequently can cause excessive cracking or crumbling of the undersized particles due to the increased movement. The shape of the finished product in this type of a system will also be irregular and not generally round.

These disadvantages are solved in the design of the present invention by providing a classification zone at or adjacent the first end of the rotary drum spray grainer through which the product particles pass in a direction counter-current to the flow of inlet air as the product particles exit the rotary drum spray grainer.

SUMMARY OF THE INVENTION

It is an object of the present invention to provide an improved rotary drum spray grainer in which the product particles must pass through at least an air classification zone prior to exiting the drum.

It is another object of the present invention to provide an improved rotary drum spray grainer wherein the product particle flow is counter-current to the direction of inlet hot air.

It is a feature of the present invention that the product particles exit the first end of the rotary drum at the point where the inlet hot air enters.

It is another feature of the present invention that the air classification zone is in a "necked down" area or a portion of the drum with a reduced diameter.

It is a further feature of the present invention that there is a recycle chute entrance for the undersized particles adjacent the opposing second end of the drum so that undersized particles may be recycled back into the drum adjacent the first end.

It is still another feature of the present invention that the hot air plenum is adjacent the first end of the rotary drum spray grainer.

It is yet another feature of the present invention that the seed particle inlet is near the first end of the rotary drum spray grainer.

It is an advantage of the present invention that the flow of the inlet hot air classifies the product particles according to their size and density to force the undersized particles back into the rotary drum spray grainer while permitting the full-sized particles to exit the drum.

It is another advantage of the present invention that product particles with improved roundness are obtained.

It is a further advantage of the present invention that the need for external recycling of the undersized product particles using an active conveying means such as a screw conveyor is avoided.

These and other objects, features and advantages are obtained in a rotary drum spray grainer for spray graining particles by having the spray grained product particles flow counter-current to the flow of inlet hot air as the product particles exit the drum at the first end where the hot air is introduced so that the particles pass through an air classification zone where they are sorted so that undersized particles are forced back into the drum for further spraying and drying and full-sized particles exit the drum.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
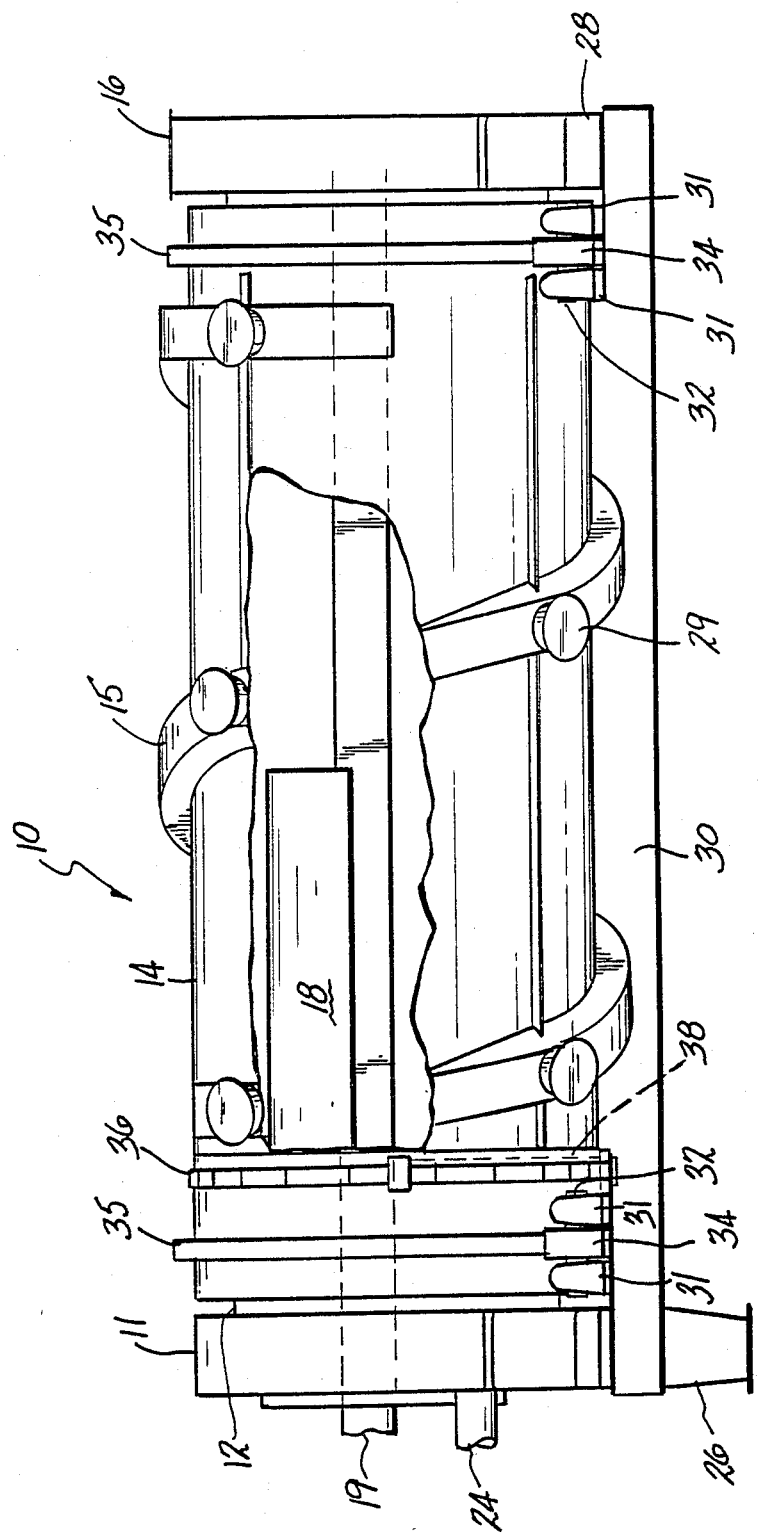
FIG. 1 is a side elevational view of a rotary drum spray grainer with a portion cut away to show the interior of the drum and with the lifting flights not shown.

Referring to FIG. 1, there is shown a rotary drum spray grainer indicated generally by the numeral 10, with a portion cut away to show the interior. The inlet hot air or hot gas plenum 11 is shown positioned adjacent a first end of the rotary drum dryer 10. An inlet 12 with reduced diameter at the first end leads into the interior of the rotary drum spray grainer 10. The rotary drum spray grainer 10 has a drum 14, generally cylindrical in shape, that extends from a position adjacent the inlet hot air plenum 11 into the outlet hot air plenum 16. A recycle chute 15 is shown winding in a helical pattern about the outside of the drum 14 to recycle product and fines from the second end of the rotary drum spray grainer 10 adjacent the outlet hot air plenum 16 to the first end of the rotary drum spray grainer 10 adjacent the inlet hot air plenum 11.

Figure 2:
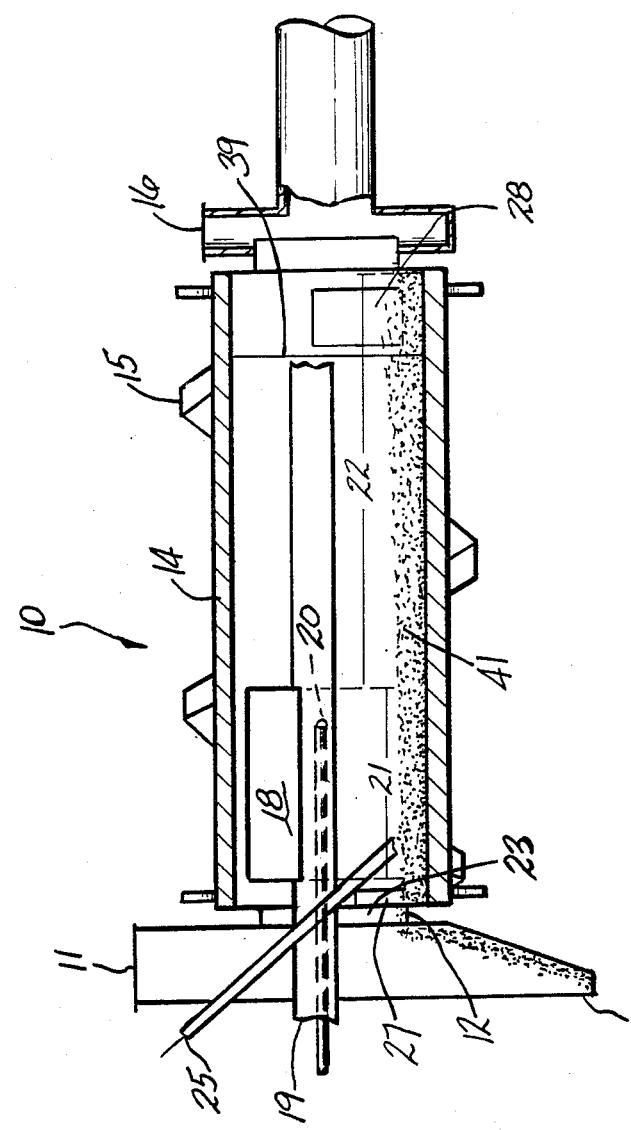
FIG. 2 is a diagrammatic cross sectional illustration of a rotary drum spray grainer of the instant design not showing the lifting flights.

Also shown in FIG. 1 is the deflector means or plate 18 that is appropriately mounted to a support beam 19 that runs the entire length of the apparatus through the inlet 12 to the outlet hot air plenum 16. Spraying means 20, generally in the form of spray nozzles, are positioned in a spraying zone 21 that underlies the deflector means 18, as seen in FIG. 2. The spraying means 20 may be supported by the support beam 19, if appropriate. A drying zone 22 is intermediate the spraying zone 21 and the opposing second end of the rotary drum spray grainer 10 adjacent the outlet hot air plenum 16. In FIG. 1, an appropriate type of conveyor, such as a screw conveyor 24, is provided to feed seed particles and possibly fines through the inlet 12 into the interior of the drum 14. In FIG. 2, this is shown diagrammatically as a feed inlet means 25.

A product discharge 26 leads to the final dryer (not shown). Spray grained particles enter the product discharge 26 by an air and rolling bed classification process which permits the larger spray grained particles to pass over the inlet 12 with its reduced diameter, seen in FIG. 1, when the depth of the particle bed 41 of FIG. 2 is sufficiently great. The air and rolling bed classification is accomplished in a classification zone or area 23 that begins in the drum 14 and continues to the inlet 12. This air and rolling bed classification will be described in greater detail hereinafter.

Recycle chute 15 has a recycle chute pick-up 28 adjacent the second end of the rotary drum spray grainer 10, as seen in FIG. 2, to permit spray grained particles and the fines to enter the recycle chute 15 and be returned to an area 27 adjacent the first end or inlet 12 of the rotary drum spray grainer 10. Air and rolling bed classification occur at this point to permit the full sized spray grained particles to exit into the product discharge 26 and the remainder to be cycled through the rotary drum spray grainer 10 for additional spraying until full-sized spray grained particles are obtained. Recycle chute access plates 29 are provided to permit entry into the recycle chute 15 as needed at selected points.

A full dam ring 39, as seen diagrammatically in FIG. 2, may be employed to control the entry of spray grained particles into the recycle chute pick-up 28. This full dam ring 39 would pass through 360° about the entire internal periphery of the drum 14.

Lifting flights (not shown) may be used about the entire internal periphery or circumference of the drum 14 in the drying zone 22 and the spraying zone 21. There may be areas of interruption of the flights in the portion of the spraying zone 21 adjacent the drying zone 22 and in the area immediately adjacent the inlet 12 to permit air and rolling bed classification to occur. The flights may be from about one and a half to about eight inches in height, depending on the size of drum 14. Another area where no flights are employed may be adjacent the second end of the drum 14 where the outlet hot air plenum 16 is located. The areas with no flights adjacent the first and second ends of the drums may extend for as much as three feet or more in length, depending upon the overall length of the drum 14. The lifting flights 40 permit the bed of particles 41 to be agitated and carried upwardly until the angle of the flight, as it moves in its rotational travel, exceeds the angle of repose of the particles so that the particles fall in cascades generally downwardly toward the bed. It is the paths of these falling cascades that permit them to be sprayed with the slurry or agglomerating agent in the spraying zone 21 and to be dried with the passage of gas, generally hot air, through them in the drying zone 22.

The deflector means or plate 18 of FIG. 1 may be shaped as an inverted "V" that is appropriately mounted to the support beam 19 or simply in a generally rectangular shape overlying the spraying means to form a full dense cascade of product particles falling off the edge thereof. The deflector means or plate 18 also overlies and protects the spraying means 20 from having the falling particles impinge thereon. The positioning of the edge of the deflector means 18 at the desired distance away from the spraying means 20 is such that the dense cascades of particles to be sprayed are at an optimum distance so that the predetermined slurry spray pattern may achieve its optimum dispersion to prevent overwetting of the particles. Also at the optimum distance, passage of the spray through the cascade does not occur so that the interior of the drum 14 does not have scaling or buildup of the slurry or agglomerating agent.

As best seen in FIG. 1, the drum 14 is mounted on support beam 30 which has bearings 31 and trunnions 32 that support the drum 14 for rotational movement. A rotating trunnion wheel 34 is positioned at each end of the drum 14 between the bearings 31 to engage a metal track 35 to guide the drum 14 in its rotary movement. A drive sprocket 36 is employed adjacent one end of the drum 14 to provide the driving force to rotate the drum at the predetermined rotational speeds.

A partial dam ring 38 seen in FIG. 1, extends from the recycle entry area 27 partially about the inside of the drum 14, for example from about one quarter to about one half or greater of the inner circumference. The material returned from the recycle chute 15 enters the drum internally or centrally of the partial dam ring 38 and is prevented from freely entering the air and rolling bed classification area adjacent the inlet 12 or first end by the partial dam ring 38. This permits a controlled, gradual and continuous feed of full sized particles into the product outlet 26. This also avoids the uneven surging of material into the classification area or zone 23 and product discharge 26, which might otherwise occur.

Figure 3:
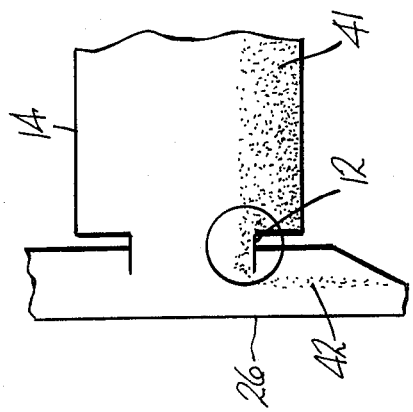
FIG. 3 is a diagrammatic illustration of the first end of a rotary drum spray grainer showing the particle bed and the spray grained particles as they exit the drum into the product discharge.

FIG. 3 shows the exit of product particles 42 from the bed of particles 41 in a rotating drum 14. The particles 42 pass out of the inlet into the product discharge 26. This FIGURE shows, in contrast to prior structures, the spray grained product particles 42 exit from the front or first end of the drum 14 into a product discharge 26, such as a hopper, and not through the opposing second end of the rotating drum 14.

Figure 4:
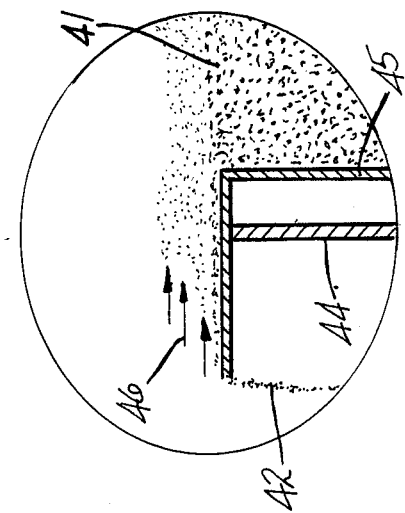
FIG. 4 is an enlarged diagrammatic illustration of a portion of the air classification zone adjacent the first end of the rotary drum spray grainer showing the counter-current direction of flow of the spray grained product particles to the direction of the inlet hot air flow.

FIG. 4 shows in an enlarged fashion the inlet 12 of the drum 14. Air flow 46 shows the flow of the forced hot air from the inlet hot air plenum 11 into the drum 14. The effect of this flow at the inlet 12 of the forced hot air 46 into the drum 14 at the point of exit of the product particles to the product discharge 26 is to produce air classification of the particles. The velocity of the air, since the direction of the air flow 46 into the drum 14 is counter-current to the flow of particles 42 out of the drum 14, forces smaller particles back into the drum so they can be recycled for additional spraying and grow in size. The smaller grains, fines, and uncoated seed particles do not have sufficient size and density to overcome the drag of the counter-current flow of air flow 46 through the inlet 12.

FIG. 4 shows in schematic or diagrammatical illustration the phenomena occurring as the product particles 42 discharge over the neck-downed or reduced diameter portion of the drum 14. This figure particularly shows how undersized particles are picked up from the rolling and bouncing bed 41 and are blown or forced back into the drum 14 for further spray coating in order to achieve the desired product size. The larger particles, because of their mass, can overcome the air drag and exit the drum into the product discharge 26.

Additionally, rolling bed classification is effected in this area by the partial dam ring 38 and the neck-downed section or area of reduced diameter of the drum 14 in the inlet 12. The undersized particles are prevented from entering the product discharge 26 by the sufficiently restrictive area of reduced diameter of the inlet 12 and by rolling bed classification that occurs in the drum 14 in the area between the partial dam ring 38 and the inlet 12. The bed 41 of particles must build up sufficiently in depth until the particles 42 begin to push their way over the neck-downed area and the partial dam ring. This rolling bed classification, then, combines with the air classification to create a classification zone which effectively controls the size of particles exiting the drum 14 at its first end.

The cross-sectional area of the inlet area 12 must be designed properly with respect to the incoming air flow 46 to maintain the necessary air velocity so that the undersized particles are blown back into the drum 14 and the full-sized product particles exit the drum. This cross-sectional area will depend on the size of the drum being operated and the air velocity. A typical air velocity has been found to be about 10 to about 12 feet per second through the inlet 12 to classify calcium hypochlorite product particles to achieve, for example, a product of the number −40 +4 U.S. Sieve Series mesh size with about 20–27 percent composition by weight of water, 10–20 percent composition by weight sodium chloride and the remaining percent composition by weight calcium hypochlorite.

In operation, a calcium hypochlorite slurry is prepared from a filter cake obtained from an appropriate filter. The slurry is prepared by mixing with water until a paste consistency similar to that of soft ice-cream is obtained, corresponding to approximately about 50 to about 59% composition of water by weight.

The rotary drum spray grainer 10 is set to the desired angle from the horizontal to affect the bed transport rate, if necessary. Normally, however, the rotary drum spray grainer 10 will be set generally horizontally.

The rotary drum spray grainer 10 is heated by feeding in the heated air or other inert gas to raise the temperature of the rotary drum dryer 10 and its metal to the desired level. A bed of particles 41 is built up in the bottom of the drum to a level until it begins to overflow the drum inlet 12. A predetermined desired amount of seed particles is fed into the drum spray grainer 10 via the screw conveyor feed inlet means 24 after the bed has been heated to approximately 140° to about 150° F. This temperature of the bed 41 is determined for example, by placing a temperature probe under the surface of the rolling bed. At a predetermined time after the seed particle flow has started, such as approximately one minute, spraying from the spraying means 20 of the slurry may commence. The air flow of heated air or other inert gas is maintained at a uniform rate to achieve maximum efficiency in the drying. The air inlet temperature can vary from approximately 260° F. to approximately 390° F., although the preferred temperature is between about 310° F. and about 360° F. Rotation of the drum commences with the infeed of the heated air prior to the loading of the drum, seed flow and spraying.

As the drum rotates, the lifting flights (not shown) agitate and carry portions of the bed 41 upwardly until the particles begin to fall from the lifting flights in cascades when the angle of repose is exceeded. When this occurs in the spraying zone 21, the cascades fall downwardly by striking the deflector means 18 and by being deflected into one thick cascade, falling closer to the outer wall of the drum 14 where the spraying means or nozzles 20 disperse the slurry in a predetermined pattern to optimize the wetting of the particulate substrate to effect the spray graining. In this manner the particles may pass through the spray pattern more than once.

When the particles have fallen to the bottom of the bed and have continued their axial movement through the spraying zone 21 to the drying zone 22, the rotation of the drum 14 causes the lifting flights 40 to carry the particles upwardly from the bed 41 again until a height is reached as the drum rotates where the angle of repose is again exceeded. Particles then fall in a generally substantially uninterrupted downward path through the drying zone 22 where they are exposed to the heated air or gas passing through the rotary drum dryer 10. This generally uninterrupted downward path of the particles permits maximum heat transfer to occur in the drying zone 22. The prevention of hot air channelling in the drying zone by the use of a deflector plate 18 in only the spraying zone 21 permits heat exchange to occur across the full width or the entire cross-sectional area of the drying zone.

When the particles in the bed 41 are transported to the rear of the drum by air drag and reach the opposing second end of the rotary drum dryer 10 adjacent the outlet hot air plenum 16, they enter the recycle chute pickup 28. The particles are then conveyed within the recycle chute 15 by the rotational movement of the drum 14 back to an area 27 within the rotary dryer drum 10 interiorly of the partial dam ring 38 where they are redeposited with any fines into the interior of the drum.

As the drum 14 rotates, the spray grained particles of the desired size rise to the top and pass around and over the partial dam ring 38 into the classification zone 23 where air and rolling bed classification is achieved. The spray grained particles 42 in the particle bed 41 must pass counter-current to the direction of the incoming air flow 46 while rolling and bouncing through the neck-downed section or area of reduced diameter at the inlet 12 of the rotating drum 14. Those particles 42 that are of sufficient size and density to pass through this area of reduced diameter and overcome the air drag, exit the rotary drum 14 and pass into the product discharge 26.

Product particles that are undersized or fines that do not pass around or over the partial dam ring 38 and out the inlet 12 into the product discharge 26 are forced back into the drum 14. These undersized particles are then recycled through the spraying zone 21 and the drying zone 22 until the particles have achieved the desired size.

As the bed of particles 41 in the rotary drum spray grainer 10 builds up in depth, it can be seen that the particles 42 begin to push their way over the neck-downed section or area of reduced diameter which serves with the partial dam ring 38 to permit the rolling bed classification to occur within the classification zone 23 of the drum 14 simultaneously with the air classification. As the particles 42 roll and bounce over this area of reduced diameter in the inlet 12 towards the product discharge 26, the large grains will finally roll and bounce through this area of reduced diameter into the product discharge 26 from where they pass to other processes, while the undersized particles are forced back into the drum 14 by the previously described air classification.

The heated air or other inert gas contacts the calcium hypochlorite particles wetted with the slurry to simultaneously evaporate and remove water and to deposit a thin layer of the calcium hypochlorite containing component of the slurry on the surface of the wetted particles. The slurry coated particles continue in the moving bed 41 and continue to be lifted, dropped and coated until they are discharged from the rotary drum dryer 10 as previously described.

The composition of the slurry may vary considerably, with any pumpable and sprayable calcium hypochlorite slurry containing from about 45% to about 90% by weight of water and preferrably from about 50 to about 60% by weight of water being employable. Generally, the slurry is prepared by admixing water with the filter cake, a calcium hypochlorite produced in any conventional commercial calcium hypochlorite process. Although water is normally used to make up the slurry, any suitable recycle liquid such as a portion of the filtrate produced in commercial calcium hypochlorite processes, scrubber liquor, or other aqueous medium that is inert to calcium hypochlorite may be employed.

The controlling factor in the preparation of this slurry is the percentage by weight of water that is present. Where the percentage by weight of water is below about 45% by weight, the resulting slurry is extremely difficult to pump and spray because it is too viscous and is cake-like, restricting the flow through the pipeline to the spraying means or nozzle. It could also plug the nozzle at this percentage. Where the water concentration is above about 90% by weight, an extremely large amount of water must be evaporated. As a result, the feed rate must be reduced and the production rate is reduced. Furthermore, there is likely to be excessive decomposition of the available chlorine in the calcium hypochlorite particles when the moist calcium hypochlorite particles must be exposed to the heated atmosphere in the drying zone and the final dryer for the extended periods of time that are necessary to effect the evaporation of excessive amounts of water.

It should be noted that the proportion of impurities in the calcium hypochlorite slurry will vary with the type of process employed to prepare the calcium hypochlorite filter cake and also with the nature of the lime initially used to prepare the calcium hypochlorite. A representative analysis of a typical calcium hypochlorite filter cake prepared by a commercial process and a typical preferred analysis range for the calcium hypochlorite filter cake used to prepare the slurry sprayed from the spraying means 20 in the predetermined slurry spray pattern and useful as the starting material in the preparation of particles by the spray graining technique are shown in Table I. This slurry is obtained from the filter cake, for example, by the addition of water.

TABLE I

| Component | Typical Filter Cake Analysis Percent by Weight | Typical Analysis Range Percent by Weight |
|---|---|---|
| Calcium hypochlorite | 45.43 | 42–48 |
| Calcium chloride | 0.44 | 0.0–1.5 |
| Calcium chlorate | 0.02 | 0.0–1.5 |
| Calcium hydroxide | 0.24 | 0.2–2.0 |
| Calcium carbonate | 0.44 | 0.1–2.0 |
| Sodium chloride | 7.75 | 6.0–8.0 |
| Water (difference) | 45.68 | 40–50 |

The rate of infeed of forced air utilized as the heated air or other inert gas can vary from about 85 to about 340 feet per minute. The temperature of the heated gas at the inlet hot air plenum 11 has previously been described. The exhaust gases pass from the rotary drum spray grainer 10 at the outlet hot air plenum 16 and can vary in range from about 130° F. to about 170° F. The effect of this flow of the forced air into the rotary drum spray grainer 10 at the inlet 12 and the point of exit of the product particles to the product discharge outlet 26, as has previously been described, is to produce air classification of the particles.

While the preferred structure in which the principles of the present invention have been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials and arrangement of parts which will occur to one of skill in the art upon a reading of the disclosure.

What is claimed is:

1. In a rotary drum spray grainer for producing spray grained product particles having a hot air inlet means adjacent a first end feeding in hot air in a first direction, air outlet means adjacent an opposing second end for removing the exhaust air, product seed particle inlet means entering the drum downstream of the first end for feeding in seed particles, spraying means extending at least partially between the hot air inlet means and the air outlet means defining a spraying zone for spraying the particles, a drying zone intermediate the spraying zone and the second end, recycle means for recycling undersized product particles back into the drum, and means to rotate the drum, the improvement comprising in combination:
   a. product outlet means adjacent the first end of the drum; and
   b. a classification zone adjacent the first end of the drum positioned between the hot air inlet means and the spraying zone so that the product particles must pass therethrough in a second direction counter-current to the first direction of the inlet hot air so that the undersized particles are forced back into the rotary drum spray grainer for more spraying while the full-sized particles pass out into the product outlet means.

2. The apparatus according to claim 1 wherein the recycle means further comprises a recycle chute having a recycle chute pick-up adjacent the opposing second end and a recycle chute return adjacent the first end.

3. The apparatus according to claim 2 wherein the rotary drum spray grainer is generally cylindrical having a generally arcuate interior periphery and a generally arcuate exterior periphery.

4. The apparatus according to claim 3 wherein the recycle chute winds in a generally helical pattern about the periphery of the drum.

5. The apparatus according to claim 1 wherein the classification zone further comprises at least partially an area of reduced diameter.

6. The apparatus according to claim 5 wherein the hot air inlet means further comprises a hot air plenum that forces hot air into the drum in the first direction.

7. The apparatus according to claim 6 wherein the product seed particle inlet means further comprises a screw conveyor to feed seed particles into the drum.

8. The apparatus according to claim 7 wherein the air outlet means further comprises an outlet hot air plenum to remove the exhaust air from the drum after it has passed through the classification zone, the spraying zone and the drying zone.

9. The apparatus according to claim 1 wherein the rotary drum spray grainer further comprises a deflector plate overlying the spraying means to collect the product particles as they fall and form a dense cascade.

10. The apparatus according to claim 9 wherein the spraying means further comprises at least one nozzle for spraying a slurry in a predetermined pattern to wet the falling product particles.

11. The apparatus according to claim 10 wherein the rotary drum spray grainer further comprises a partial dam ring which passes about a portion of the interior periphery of the drum to prevent recycled product particles from freely moving toward the product outlet means.

* * * * *